United States Patent
Mahishi

(10) Patent No.: US 10,680,944 B2
(45) Date of Patent: Jun. 9, 2020

(54) ARBITRATING MASTERSHIP BETWEEN REDUNDANT CONTROL PLANES OF A VIRTUAL NODE

(71) Applicant: Juniper Networks, Inc., Sunnyvale, CA (US)

(72) Inventor: Shrish Mahishi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/875,449

(22) Filed: Jan. 19, 2018

(65) Prior Publication Data

US 2019/0230031 A1 Jul. 25, 2019

(51) Int. Cl.

| | |
|---|---|
| *G01R 31/08* | (2020.01) |
| *H04L 12/715* | (2013.01) |
| *H04L 12/713* | (2013.01) |
| *H04L 12/24* | (2006.01) |
| *G06F 9/54* | (2006.01) |
| *G06F 9/455* | (2018.01) |

(52) U.S. Cl.
CPC ............. *H04L 45/64* (2013.01); *G06F 9/545* (2013.01); *H04L 41/0668* (2013.01); *H04L 45/586* (2013.01); *G06F 9/455* (2013.01)

(58) Field of Classification Search
CPC ................................................ G06Q 30/0641
See application file for complete search history.

(56) References Cited

U.S. PATENT DOCUMENTS

| | | | |
|---|---|---|---|
| 8,510,821 B1 * | 8/2013 | Brandwine | H04L 63/1416 709/229 |
| 9,491,107 B1 | 11/2016 | Scudder et al. | |
| 10,142,226 B1 * | 11/2018 | Wu | H04L 45/74 |
| 2005/0083833 A1 * | 4/2005 | Gettala | H04L 12/56 370/219 |
| 2006/0092857 A1 | 5/2006 | Ansari et al. | |

(Continued)

OTHER PUBLICATIONS

"Junos Node Slicing Feature Guide," Junos OS, Juniper Networks, Inc., Jan. 11, 2018, 7 pp.

(Continued)

*Primary Examiner* — Gerald A Smarth
(74) *Attorney, Agent, or Firm* — Shumaker & Sieffert, P.A.

(57) ABSTRACT

In one example, a management component executes on a network device, a first routing component executing on a first server device physically separate from the network device to provide control plane routing functionality for a virtual node on the network device, and a second routing component executing on a second server device physically separate from the network device to provide control plane routing functionality for the virtual node, wherein the first routing component and the second routing component operate as a redundant master-backup pair for the virtual node. The management component is configured to detect first reachability of the network device with a first routing component and second reachability of the network device with a second routing component, and send a control message to each of the first routing component and the second routing component, the control message specifying reachability information indicating the first reachability and the second reachability.

20 Claims, 8 Drawing Sheets

(56) References Cited

U.S. PATENT DOCUMENTS

| | | | | |
|---|---|---|---|---|
| 2006/0092974 A1* | 5/2006 | Lakshman | ............... | H04L 45/04 370/469 |
| 2010/0284411 A1* | 11/2010 | Mirani | .................. | G06F 9/5005 370/400 |
| 2012/0246637 A1* | 9/2012 | Kreeger | ............... | H04L 67/1038 718/1 |
| 2013/0070761 A1* | 3/2013 | Kamble | ................ | H04L 49/253 370/389 |
| 2013/0329548 A1* | 12/2013 | Nakil | .................. | H04L 41/0668 370/228 |
| 2015/0381493 A1* | 12/2015 | Bansal | .................... | H04L 45/30 370/392 |
| 2017/0163476 A1 | 6/2017 | Killadi et al. | | |

OTHER PUBLICATIONS

Extended Search Report from counterpart European Application No. 18203654.1, dated May 15, 2019, 12 pp.

Response filed Jan. 21, 2020 to the Extended Search Report from counterpart European Application No. 18203654.1, dated May 15, 2019, 16 pp.

Examination Report from conterpart European Application No. 18203654.1, dated Mar. 19, 2020, 10 pp.

\* cited by examiner

ARBITRATING MASTERSHIP BETWEEN REDUNDANT CONTROL PLANES OF A VIRTUAL NODE

TECHNICAL FIELD

The disclosure relates to computer networks and, more particularly, to communicating packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information. Routers may include one or more packet processors, e.g., packet forwarding engines, and a switch fabric. Packet processors may receive and send data via interface cards. The switch fabric provides an interconnect mechanism for forwarding data between the packet forwarding engines for transmission over a network, e.g., the Internet. Routers use routing protocols to exchange routing information. Routers often maintain the routing information in the form of one or more routing tables or other data structures. Routers may generate and maintain forwarding information in accordance with the routing information.

Routers may use multiple redundant control plane routing components to redundantly maintain the routing information, thereby providing a more robust arrangement, in which at least one of the control plane routing components operates as a master routing component and the remaining control plane routing components operate as backup routing components. For proper operation, one and only one of the redundant control plane routing components should operate as the master routing component.

SUMMARY

In general, this disclosure describes techniques for arbitrating mastership between multiple redundant control planes of a virtual node configured on a network device. Node virtualization virtualizes a network device, which may include a single chassis, into multiple network nodes (virtual nodes, also called "node slices") by partitioning hardware resources of the network device among the virtual nodes. For example, node virtualization allows for partitioning a physical router into multiple virtual nodes. A virtual node is a combination of a control plane (routing plane) and a data plane (forwarding plane), with dedicated forwarding units assigned to the virtual node. The data planes are provided by one or more forwarding unit resources, and along with the associated control plane, the virtual nodes act as distinct routers. In some examples, control plane functionality of a virtual node may be provided by redundant control plane routing components executed by one or more server devices external to the router. In some cases, the redundant control plane routing components are executed by different physical server devices, separate from the router chassis and in communication with packet processors of the router via physical links.

In node virtualization, the virtual node control planes are operated by a set of software instances which may execute on external servers connected to the network device chassis. For example, master and backup routing components for each virtual node run on two separate external servers to provide hardware redundancy. In a node virtualization deployment, high availability is provided by master and backup routing components, which exchange periodic keepalives through software. Unlike redundant routing engines in a physical network device chassis, there is no hardware-level mastership arbitration available for virtual node routing components. Since mastership is only based on software-level arbitration, the node virtualization architecture may lead to a "split-brain" situation when there are multiple link faults in the system, the master and backup virtual node routing components become isolated from one another, and either none or two or more of the routing components claim mastership. The techniques of this disclosure provide a mechanism to provide correct routing component mastership arbitration even in the presence of multiple link faults in the system to avoid the split-brain condition.

For example, the management component detects whether the master and backup virtual node routing components are reachable via one or more interfaces of the management component, and periodically sends control messages to the routing components specifying the detected reachability information. The master and backup virtual routing components that receive the control message will arbitrate mastership by taking into account the reachability information specified in the control message.

The techniques described in this disclosure may provide one or more advantages. For example, because physical links connecting server devices to network device chassis are vulnerable to faults, virtual nodes should be resilient to single/multiple failures in the system. The techniques may provide improved resiliency and help the system remain operational even in the presence of multiple faults, including faults of more than two physical links in the system. Some potential advantages of node virtualization may include the ability to run multiple types of network device, isolate functions and services, and streamline capital expenses. The ability to handle mastership arbitration for external routing components in the presence of multiple faults may make the node virtualization approach more robust.

In one example aspect, a system includes a management component executing on a network device; a first routing component executing on a first server device physically separate from the network device and configured to provide control plane routing functionality for a virtual node of a plurality of virtual nodes configured on the network device; and a second routing component executing on a second server device physically separate from the network device and configured to provide control plane routing functionality for the virtual node, wherein the first routing component and the second routing component operate as a redundant master-backup pair for the virtual node, wherein the management component is configured to detect first reachability of the network device with a first routing component and second reachability of the network device with a second routing component, and send a control message to each of the first routing component and the second routing component, the control message specifying reachability information indicating the first reachability and the second reachability, and wherein one or more of the first routing component and the second routing component are configured to determine, in response to receiving the control message and based on the reachability information, whether to operate as a master routing component for the virtual node.

In a further example aspect, a method includes detecting, by a management component executing on a network device, first reachability of the network device with a first routing component and second reachability of the network device with a second routing component, wherein the first routing component executes on a first server device physically separate from the network device and is configured to provide control plane routing functionality for a virtual node of a plurality of virtual nodes configured on the network device, and wherein the second routing component executes on a second server device physically separate from the network device and is configured to provide control plane routing functionality for the virtual node, wherein the first routing component and the second routing component operate as a redundant master-backup pair for the virtual node; and sending, by the management component, a control message to each of the first routing component and the second routing component, the control message specifying reachability information indicating the first reachability and the second reachability, wherein the reachability information determines mastership arbitration by the first and second routing components.

In a further example aspect, a method includes receiving, by a first routing component executing on a first server device physically separate from a network device and configured to provide control plane routing functionality for a virtual node of a plurality of virtual nodes configured on the network device, a control message specifying reachability information, the reachability information comprising first reachability of the network device with the first routing component and second reachability of the network device with a second routing component, wherein the second routing component executes on a second server device physically separate from the network device and is configured to provide control plane routing functionality for the virtual node, wherein the first routing component and the second routing component operate as a redundant master-backup pair for the virtual node; and determining, by the first routing component, whether to operate as a master routing component for the virtual node.

In another example aspect a non-transitory computer-readable storage medium includes instructions for causing one or more programmable processors of a first server device to: receive, by a first routing component executing on the first server device and configured to provide control plane routing functionality for a virtual node of a plurality of virtual nodes configured on a network device, a control message specifying reachability information, the reachability information including first reachability of the network device with the first routing component and second reachability of the network device with a second routing component, wherein the first server device is physically separate from the network device, and wherein the second routing component executes on a second server device physically separate from the network device and is configured to provide control plane routing functionality for the virtual node, wherein the first routing component and the second routing component operate as a redundant master-backup pair for the virtual node; and determine whether the first routing component is to operate as a master routing component for the virtual node.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
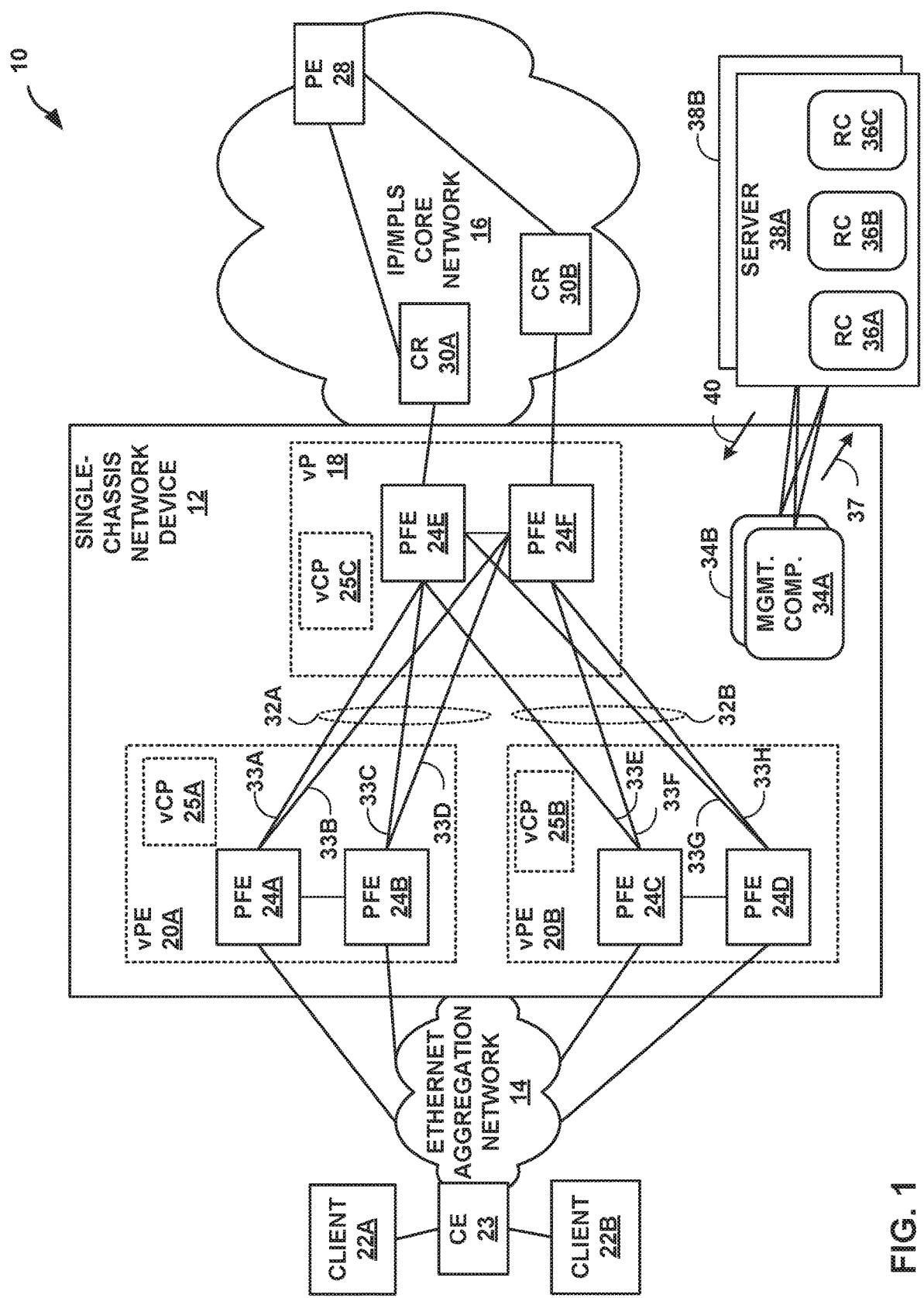
FIG. 1 is a block diagram illustrating an example network environment that includes a network device configured with multiple virtual nodes, in accordance with techniques described in this disclosure.

FIG. 1 is a block diagram illustrating an example network environment 10 that includes a single-chassis network device configured with multiple virtual nodes, in accordance with techniques described in this disclosure. For purposes of example, the techniques of this disclosure are described with respect to a simplified network environment 10 of FIG. 1 in which single-chassis network device 12 communicates with core routers 30A-30B ("core routers 30") to provide client devices 22A-22B ("client devices 22") with access to services provided by devices in Internet Protocol (IP)/Multi-Protocol Label Switching (MPLS) core network 16. Single-chassis network device 12 may exchange routing information with core routers 30A-30B to maintain an accurate representation of the topology of network environment 10. Single-chassis network device 12 in this example includes virtual provider edge (vPE) nodes 20A-20B ("vPEs 20") and virtual core router (vP) node 18, which are cooperative virtual routers operating as multiple distinct nodes from the perspective of network devices external to single-chassis network device 12.

Single-chassis network device 12 is a router having a single physical chassis, which is virtualized into multiple virtual network nodes (also referred to herein as Guest Network Functions (GNFs)) by partitioning hardware resources of the router, such as packet processors (e.g., packet forwarding engines (PFEs)), among the virtual nodes. Single-chassis network device 12 includes multiple routing components (e.g., routing processes) and packet processors (e.g., PFEs) that are physically coupled and configured to operate as multiple independent, separate logical routers. To core routers 30 and CE router 23 of network environment 10, single-chassis network device 12 appears as multiple routing devices, specifically, virtual PE (vPE) router 20A, vPE router 20B, and virtual provider (vP) router 18. For example, although single-chassis network device 12 includes a single chassis housing at least the forwarding planes of all of the virtual nodes, from the perspective of core routers 30, single-chassis network device 12 has multiple externally-advertised network addresses and maintains multiple peer routing sessions for each routing protocol maintaining peer routing sessions with each of the core routers 30.

In the example of FIG. 1, each of virtual nodes 18, 20 includes one or more PFEs 24A-24F ("PFEs 24"). Individual PFEs 24 are associated with a particular virtual node and are not shared among multiple virtual nodes. In some examples, GNFs share forwarding resources at a flexible programmable integrated circuit (PIC) concentrator (FPC) level, while in other examples, FPCs are associated with particular virtual nodes and are not shared among multiple virtual nodes.

Each virtual node's control plane (vCP) 25A-25C ("vCPs 25") may instantiate with virtual machine (VM) technology. The vCP 25 either could be within the routing engine (RE) of single-chassis router 14 or, as shown in FIG. 1, may reside outside single-chassis router 14, such as in the form of multiple routing components ("RC") 36A-36C ("routing components 36") in physically separate (i.e., external) servers 38A, 38B. For example, vCP 25A may be provided by a master routing component 36A on server 38A, and a corresponding backup routing component (not shown) on server 38B. vCP 25B may be provided by a master routing component 36B on server 38A, and a corresponding backup routing component (not shown) on server 38B. vCP 25C may be provided by a master routing component 36C on server 38A, and a corresponding backup routing component (not shown) on server 38B.

Each virtual node could serve the role of different network functions, such as Internet service provider edge (PE), Virtual Private Network (VPN) service PE (vPE) and Multiprotocol Label Switching (MPLS) Label Switching Router (LSR) (vP). In some examples, a virtual node may be operating as, for example, virtual provider edge or virtual customer edge routers, virtual autonomous system border routers (ASBRs), virtual area border routers (ABRs), or another type of network device, such as a virtual switch.

Apart from the virtual node, single-chassis network device 12 also includes a management component 34A (e.g., an administrative base system ("BSYS") component) instantiated for managing shared resources of single-chassis network device 12 (e.g., a management plane). In node virtualization, a router chassis routing engine may function as a base system. Management component 34A is responsible for management all the physical components of the network device 12, including all line cards and fabric. Through management operating system (OS) configuration at management component 34A, an administrator can assign line cards to GNFs and define Abstracted Fabric (AF) interfaces 32A, 32B between GNFs. The management component software runs on a pair of redundant management components 34A-34B (e.g., routing engines) of single-chassis network device 12. Management component 34A may be a master management component and management component 34B may be a backup management component. A virtual node logically owns the line cards assigned to it by the base system (BSYS), and maintains the forwarding state of the line cards. In some examples, the OS control plane of each virtual node runs as pair of redundant virtual machines, containers, or natives (routing components 36 and counterparts on server 38B).

In one example, assume vPE 20A and vPE 20B each provide MPLS-based VPN services, and CE 23 connects to PFE 24A. Assume also that each of vPE 20A and vPE 20B connects to vP 18 with fabric equal cost logical paths via PFE 24E and PFE 24F. When a packet comes to vP 18 from IP/MPLS core network 16 and destined for CE 23, vP 18 may send data traffic to either PFE 24A or PFE 24B based on ECMP load balancing. In the example of FIG. 1, vP 18 is a shared uplink that connects vPEs 20A-20B to IP/MPLS core network 16. Shared uplink may be implemented using an MPLS LSR virtual node instance for vP 18. vPEs 20 share uplink bandwidth.

The configuration of network environment 10 illustrated in FIG. 1 is merely an example. Although not illustrated as such, IP/MPLS core network 16 may be coupled to one or more networks administered by other providers, and may thus form part of a large-scale public network infrastructure, e.g., the Internet. Ethernet aggregation network 14 may be viewed as an access network to the Internet. Service provider network 6 may provide computing devices coupled to client devices 22A-22B ("client devices 22") with access to the Internet, and may allow the computing devices within customer networks (not shown) to communicate with each other. In another example, IP/MPLS core network 16 may provide network services within the core of the Internet. In either case, IP/MPLS core network 16 may include a variety of network devices (not shown) other than single-chassis network device 12, provider edge (PE) router 28, and core routers 30, such as additional routers, switches, servers, or other devices.

Unlike redundant routing engines in a physical router chassis, there is no hardware-level mastership arbitration available for routing components 36. Since mastership is only based on software-level arbitration, the node virtualization architecture may lead to a "split-brain" situation when there are multiple link faults in the system, the master and backup routing components 36 become isolated from one another, and either none or more than one of the routing component 36 claim mastership. Split-brain causes a routing component to be unusable (which is equivalent to a router being down) and adversely affects the customer (e.g., clients 22).

Routing components 36 send keepalive messages 40 to management component 34A, and to management component 34B. For simplicity, only one keepalive message 40 is shown, although there may be several such messages. In some examples, keepalive message 40 may be exchanged between one routing component 40 for a virtual node and another routing component 36 for the same virtual node, via management component 34A. When management component 34A receives keepalive message 40 from a routing component 36 for a virtual node, management components 34A may then forward the keepalive message 40 on to the other redundant routing components 36 for the virtual node. Management component 34A may also store data indicating whether keepalive messages have been received from the master and backup routing components.

In accordance with the techniques of this disclosure, for each GNF, master management component 34A generates and sends, to the master and backup GNF REs, respective control messages 37 that each specifies routing component reachability information, indicating whether each of the master and backup routing components for that routing component are reachable via each of the links coupling the master and backup routing components to the master and backup management components. In some examples, there may be multiple backup routing components and/or multiple backup management components. Each routing component 36 that receives one of control messages 37 takes into account the routing component reachability information carried by the control message 37 when determining whether to remain as a master or backup routing component or change to a different role. With the additional routing component reachability information provided by the master management component 34A, the routing components 36 can make a more informed mastership arbitration.

Client devices 22 may be access nodes coupled to customer networks and subscriber devices. Client devices 22 may be clients of services provided by PE router 28. In this example, service provider network includes client devices 22 and customer edge (CE) router 23 that provide subscriber devices with access to aggregation network 14. In some examples, CE router 23 may comprise a router that maintains routing information between subscriber devices and aggregation network 14. CE router 23, for example, may include Broadband Remote Access Server (BRAS) functionality to aggregate output from one or more client devices 22 into a higher-speed uplink to aggregation network 14.

Client devices 22 may be devices associated with one or more customer networks (not shown) coupled to customer edge (CE) router 23. In some examples, client devices 22 may include computing devices, such as personal computers, laptop computers, handheld computers, workstations, servers, switches, printers, customer data centers or other devices, for example. In other examples, client devices 22 may be endpoint devices such as a switch, a router, a gateway, or another terminal that operates as a demarcation point between customer equipment, such as subscriber devices, and service provider equipment. In one example, client devices 22 may comprise a digital subscriber line access multiplexer (DSLAM) or other switching device. For example, client devices 22 may be connected to one or more wireless radios or base stations (not shown) to wirelessly exchange packetized data with subscriber devices. Client devices 22 may comprise a switch, a router, a gateway, or another terminal that aggregates the packetized data received from the wireless radios to CE router 23. In some examples, aggregation network 14 may include an optical access network. For example, CE router 23 may comprise an optical line terminal (OLT) connected to one or more client devices 22 or optical network units (ONUS) via optical fiber cables.

Between two virtual nodes in single-chassis network device 12, one logical layer-3 link is provisioned that is visible to devices external to single-chassis network device 12. For example, in FIGS. 1A and 1B, these are abstract fabric interface (AFI) links 32A-32B ("AFI links 32"). Each of AFI links 32 are layer-3/layer-2 logical link constructs. AFI provides virtual node-to-virtual node connectivity. AFI links 32 bundle those fabric interconnects that connect the same virtual node. AFI provides a single logical link connectivity between the virtual node, and could have many layer-1, layer-2, or layer-3 fabric bundling within, depending on implementation.

In the example of FIG. 1, AFI links includes fabric interconnects 33A-33D, and AFI 32B includes fabric interconnects 33E-33G (collectively, "fabric interconnects 33"). Abstract fabric interfaces may alternatively be referred to as "aggregate fabric interfaces." Fabric interconnects terminate at fabric interfaces of one of PFEs 24. In some examples, the fabric interfaces have assigned identifiers that are not generally advertised to devices external to single-chassis network device 12. The fabric interconnects 33 are modelled as point-to-point Ethernet links between a pair of PFEs 24. AFI and fabric interfaces (FIs) emulate point-to-point interfaces. AFI link 32 end-points have user-configured IP-addresses. From a protocols perspective, AFI link 32 end-points are used for control-session termination.

Figure 2:
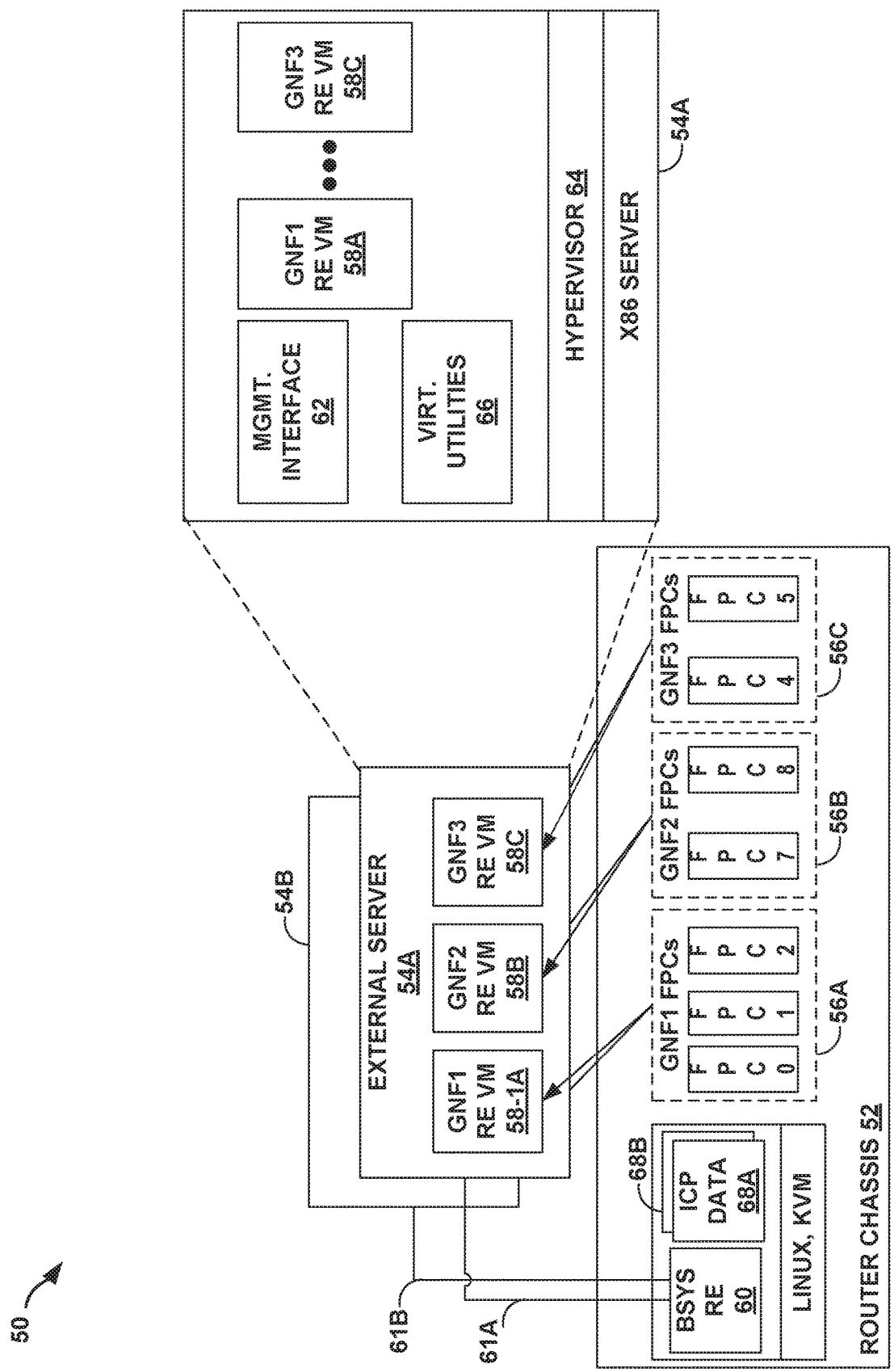
FIG. 2 is a block diagram illustrating a node virtualization layout, in accordance with techniques described in this disclosure.

FIG. 2 is a block diagram illustrating a node virtualization layout, in accordance with techniques described in this disclosure. One or more components of FIG. 2 may correspond to those in FIG. 1. For example, router chassis 52 may represent single-chassis router; generalized network functions (GNFs) 1, 2, and 3 may represent virtual nodes such as vPE 20A, vPE 20B, and vP 18, respectively; BSYS RE 60 may represent management component 34A; external servers 54A, 54B may represent servers 38A, 38B; and GNF routing engine (RE) virtual machines (VMs) 58 may represent routing components 36. GNF RE VMs 58 provide the control plane for router chassis 52, and BSYS (Base SYStem) RE 60 is a controller that runs natively on router chassis 52. BSYS RE 60 may be a kernel-based virtual machine for a Linux kernel of router chassis 52, in some examples. In some examples, BSYS RE 60 may run as a bare-metal component. Although shown in FIG. 2 with only one BYS RE 60, BSYS RE 60 may be one of a plurality of BSYS REs, such as one of a master/backup pair on router chassis 52. The control plane for each GNF runs as a master-backup pair of VMs. In some examples, a GNF RE VM for a GNF that runs on server 54A may execute routing functionality considered equivalent to Routing Engine slot 0 of a conventional router, and the GNF RE VM for the GNF that runs on server 54B may execute routing functionality considered equivalent to Routing Engine slot 1 of a conventional router.

Router chassis 52 also includes a plurality of forwarding units or line cards, shown in FIG. 2 as flexible programmable integrated circuit (PIC) concentrators (FPCs) 56A-56C ("FPCs 56") that together with a switch fabric (not shown in FIG. 2) provide a data plane for processing network traffic. FPCs 56 receive and send data packets via interfaces of interface cards (not shown) each associated with a respective one of FPCs 56. Each of FPCs 56 and its associated IFC(s) may represent a separate line card insertable within router chassis 52. Example line cards include flexible programmable integrated circuit (PIC) concentrators (FPCs), dense port concentrators (DPCs), and modular port concentrators (MPCs). Each of the IFCs may include interfaces for various combinations of layer two (L2) technologies, including Ethernet, Gigabit Ethernet (GigE), and Synchronous Optical Networking (SONET) interfaces, that provide an L2 interface for transporting network packets. Links 61A, 61B ("links 61") connect the GNFs of external servers 54A, 54B to BSYS RE 60. In some examples, links 61 may be Ethernet links. Although shown in FIG. 2 as having two links 61, in fact there may be a separate link between each BSYS RE instance on router chassis 52 and each of external servers 54A and 54B.

Each of the master and backup GNF RE VMs in combination with the respective GNF FPCs 56 serves as a separate virtual node, also referred to as a GNF or node slide. In the arrangement of FIG. 2, none of the GNFs (GNF1, GNF2 and GNF3) is aware of the others, e.g., in the sense of having information about the hardware details of the others. Further, even the data plane GNF FPCs are unaware of other FPCs. For example, FPC0 of GNF1 has awareness of FPC1 and FPC2, but not of FPC7, FPC8, FPC4, or FPC5. In one example, GNF1 can be an aggregation router, GNF2 a border network gateway (BNG) router and GNF3 a shared uplink, i.e., a core router.

GNF RE VMs 58 may each execute a corresponding routing process that executes one or more interior and/or exterior routing protocols to exchange routing information with other network devices and store received routing information in a routing information base (not shown). For example, GNF RE VMs 58 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). The routing information base may include information defining a topology of a network, including one or more routing tables and/or link-state databases. Each of GNF RE VMs 58 resolves the topology defined by the routing information base to select or determine one or more active routes through the network and then installs these routes to forwarding information bases of GNF FPCs 56.

Management interface ("MGMT. INTERFACE") 62 provides a shell by which an administrator or other management entity may modify the configuration of GNF1, GNF2, and GNF3 using text-based commands. Using management interface 62, for example, management entities may enable/disable and configure services, manage classifications and class of service for packet flows, install routes, enable/disable and configure rate limiters, configure traffic bearers for mobile networks, and configure abstract fabric interfaces between GNFs, for example.

Virtualization utilities ("VIRT. UTILITIES") 66 may include an API, daemon and management tool (e.g., libvirt) for managing platform virtualization. Virtualization utilities 66 may be used in an orchestration layer of hypervisor 64. Hypervisor 64 may be a kernel-based virtual machine (KVM) for a Linux kernel of external server 54A.

In a node slicing deployment, high availability is provided by master and backup GNF RE VMs 58, which exchange periodic keepalive messages (or "hello" messages) via links 61 and BSYS RE 60. The keepalive may be sent according to an internal control protocol (ICP) for communication between components of router chassis 52. BSYS RE 60 may store state in one or more data structures that indicates whether the keepalive messages were received as expected from each of GNF RE VMs 58. For example, BSYS RE 60 may update current ICP data structure 68A ("ICP DATA 68A") and backup ICP data structure 68B ("ICP DATA 68B") each time a keepalive message is received from a master or backup GNF RE VM 58, respectively.

Current ICP data structure 68A would store all currently/actively used ICP entries by the kernel for control packet forwarding. Current ICP data structure 68A would have one entry per ICP neighbor. Backup ICP data structure 68B would store all ICP entries that are learned for various ICP neighbors in the system. There may be more than one entry per neighbor in the backup table.

The techniques of this disclosure provide a mechanism to provide correct GNF mastership arbitration even in the presence of multiple link faults in the system to avoid the split-brain condition and avoid service disruption by allowing the backup GNF RE VM to take over mastership in certain situations, including when the master and backup GNF REs have lost communication with each other. The techniques employ a distributed algorithm running in BSYS REs 122 and GNF REs 120. BSYS REs 122 are used as triangulation points for mastership arbitration of master and backup GNFs. Master BSYS RE 122A will periodically send reachability information of all GNFs through a control message, such as the control message 80 of FIG. 3. This control message is received by GNF RE0/RE1 VMs. GNF RE VMs will use GNF reachability info received from master BSYS RE in the mastership arbitration logic.

The following aspects are described in further detail below: (1) Detection of GNF reachability info at BSYS RE using ICP hellos; (2) Encoding and propagation of GNF reachability info from BSYS RE to GNFs using new control packet/message; (3) Enhanced Mastership arbitration algorithm at GNFs.

1) Detection of GNF reachability info at BSYS RE: BSYS RE uses ICP hello packets to derive the reachability information of RE0 and RE1 VMs of all GNFs at master BSYS RE. ICP hello packets from GNF VMs are received on both em0 (re-pfe) and em1 (re-ore) interfaces at BSYS master RE. BSYS master RE stores this GNF reachability information in current and backup ICP data structures 68A, 68B. At steady state with no faults, both RE0 and RE1 GNF VMs should be reachable via both em0 and em1 interfaces. Whenever there is a fault on the external Ethernet links or a VM dies, ICP packets will stop coming in at BSYS RE on one or both of em0, em1 interfaces. ICP timeout (e.g., 3 sec) happens and the BSYS RE removes the associated ICP entry from current and backup ICP data structures 68A, 68B. Thus, BSYS RE can use the information in current and backup ICP data structures 68A, 68B as a source of GNF VMs reachability information.

2) Encoding and propagation of GNF reachability info from BSYS RE to GNFs: The BSYS RE encodes and sends the GNF reachability information to GNFs using a new ICP control packet.

3) Enhanced Mastership arbitration algorithm at GNFs: GNF RE0 and RE1 instances receive periodic ICP control packets sent from BSYS RE containing GNF reachability information. This information is used to enhance the Mastership arbitration algorithm at GNFs is described below.

When a GNF VM RE times out on not receiving keepalives from its peer RE, the GNF VM RE makes a local mastership decision, such as by applying the following example rules:

1. If current backup, and both master reachability bits not set, the GNF RE will acquire mastership.
2. If current backup, and at least one master reachability bit set, the GNF RE continues to remain as backup.
3. If current backup, and no master reachability ICP control packets received within a configurable time period (e.g., 3 seconds), the GNF RE continues to remain as backup.
4. If current master, and at least one master reachability bit set, the GNF RE continues to remain as master.
5. If current master, and both master reachability bit not set, the GNF RE will relinquish mastership.
6. If current master, and no master reachability ICP control packets received within a configurable time period (e.g., 3 seconds), the GNF RE will relinquish mastership.

Figure 3:
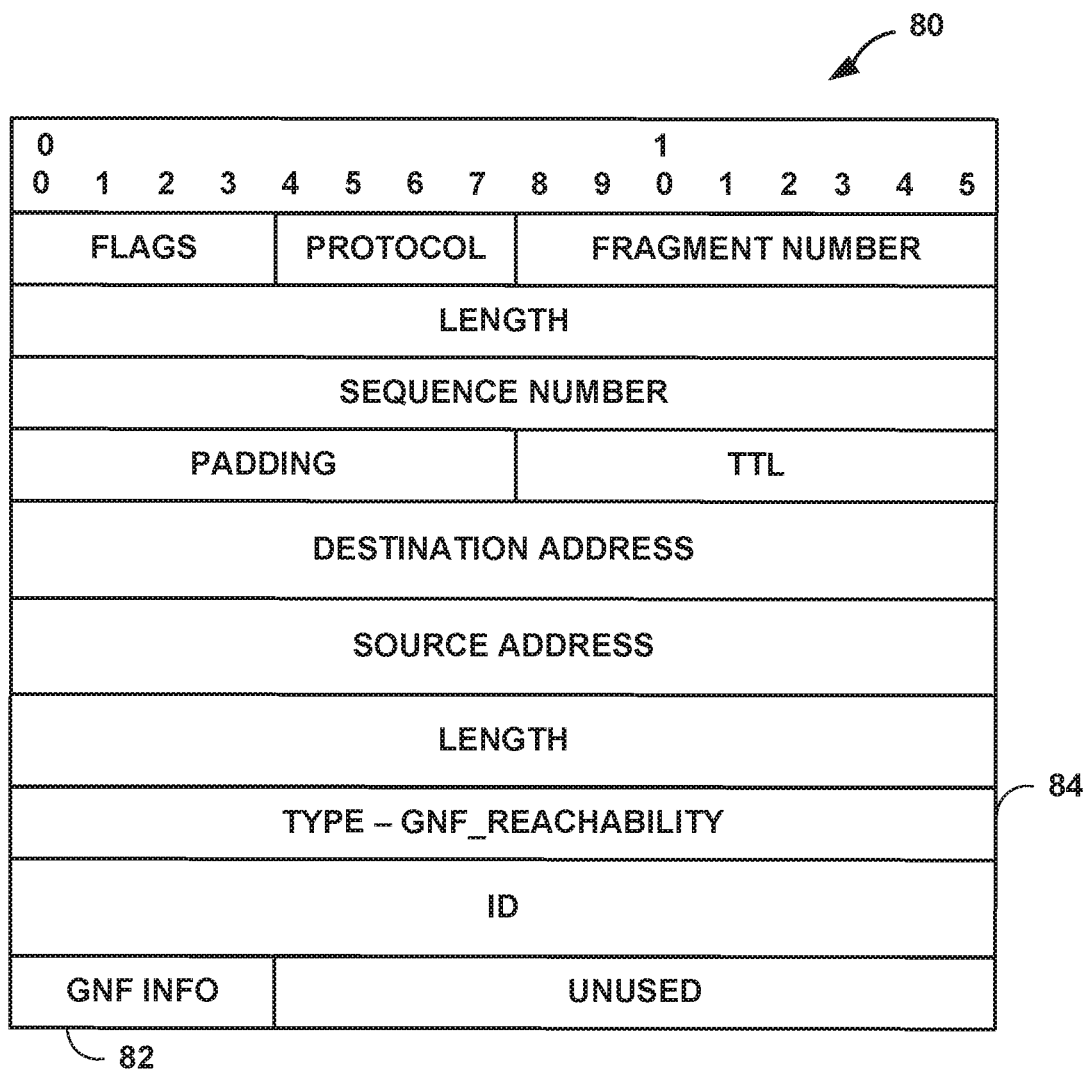
FIG. 3 is a block diagram illustrating an example message format for new control message type for sending GNF reachability information, in accordance with techniques described in this disclosure.

FIG. 3 is a block diagram illustrating an example message format for a new control message type for sending GNF reachability information, in accordance with techniques described in this disclosure. The GNF reachability information indicates reachability between the GNF routing engine VMs and the BSYS RE on the control board. In some examples, the control message may be a Trivial Network Protocol (ICP) message. ICP runs over the connection between the routing engines and the control board in the router's forwarding plane (e.g., packet forwarding engine), and uses IP at the network layer.

In the example of FIG. 3, the ICP control packet may use 4-bits to encode RE0/RE1 VM reachability information for all of the GNFs. Example:

| Bit 3 | Bit 2 | Bit 1 | Bit 0 |
|---|---|---|---|
| re1-em1 | re1-em0 | re0-em1 | re0-em0 |

The meaning of these bits is:
re1-em1=>gnfX-re1 is reachable (if 1) or unreachable (if 0) via em1 at BSYS master RE
re1-em0=>gnfX-re1 is reachable (if 1) or unreachable (if 0) via em0 at BSYS master RE
re0-em1=>gnfX-re0 is reachable (if 1) or unreachable (if 0) via em1 at BSYS master RE
re0-em0=>gnfX-re0 is reachable (if 1) or unreachable (if 0) via em0 at BSYS master RE The encoded GNF reachability information is sent using ICP control packet to both RE0 and RE1 VMs of that GNF.

The techniques of this disclosure define a new control message type specified in message type field 84 for sending GNF reachability information: # define ICP_CONTROL_TYPE_GNF_REACHABILITY 0x0004. The control message for sending GNF reachability information may include one bit of GNF reachability data per Ethernet link between an RE instance and a BSYS RE on the control board. In an example in which there are two GNF RE instances and two (primary and backup) BSYS REs, there may be a total of four bits of GNF reachability data. In the example of FIG. 2, the master BSYS RE 60 copies four bits of GNF reachability data from current and backup ICP data structures 68A, 68B into the data portion of the GNF reachability control packet, such as in the "GNF info" field 82 of message 80.

The master BSYS RE unicast sends the GNF reachability control packet to RE0 and RE1 VMs of a given GNF. In some examples, and master BSYS RE sends the GNF reachability control packets at a periodic interval of 1 second. In other examples, other periodic intervals may be used, or the GNF reachability control packet may be sent at other non-periodic times, such as in response to changes in current and backup ICP data structures 68A, 68B.

FIGS. 4-7 are block diagrams illustrating various states of an example system 110 having multiple GNF control plane software RE instances coupled to primary and backup BSYS REs via multiple control boards (CB) 124A-124B ("CBs 124"). The GNF control plane software RE instances include a first GNF RE instance 120A ("GNF RE 120A") executing on a first physical server 130A, and a second GNF RE instance 120B ("GNF RE 120B") executing on a second physical server 130B that is physically separate from first physical server 130A. Servers 130A-130B ("servers 130") are physically separate from control boards 124A-124B ("control boards 124"). GNF REs 120A-120B ("GNF REs 120") may represent one of vCPs 25A-25C or one of GNF1 RE VM 58A, GNF2 RE 58B, and GNF3 RE 58C (FIG. 2), for example. Together, GNF REs 120 and FPC 128 form a virtual node (also known as a "GNF" or node slice) of a network device such as a router. GNF RE 120A and GNF RE 120B operate as a redundant master-backup pair for the virtual node.

Figure 4:
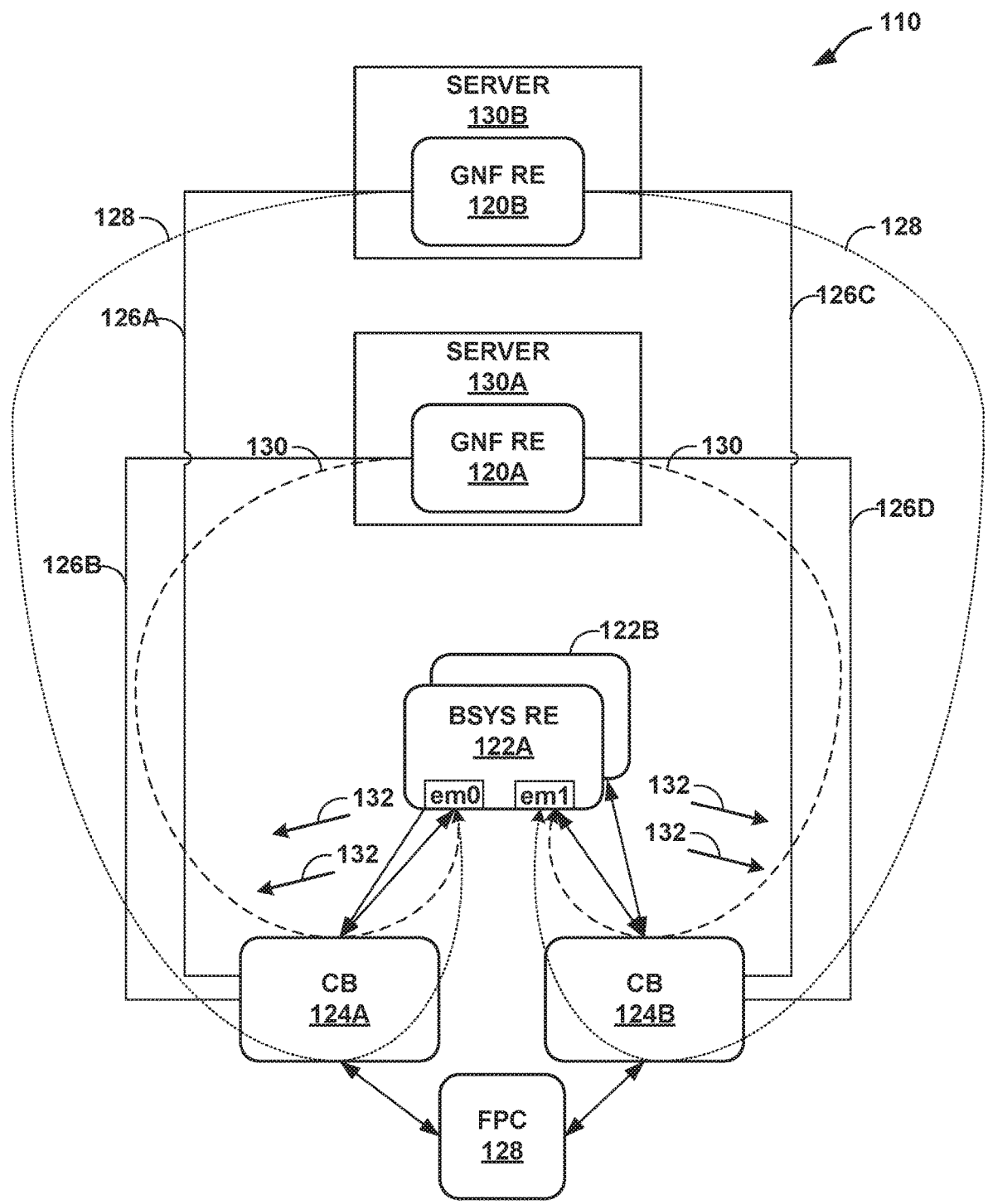
FIGS. 4-7 are block diagrams illustrating various states of an example system having multiple GNF control plane software RE instances coupled to primary and backup BSYS REs via multiple control boards

As shown in FIG. 4, four Ethernet links 126A-126D ("links 126") via control board (CB) 124 in the router chassis connect each BSYS routing engine to a pair of external servers (only the links between the GNF REs and BSYS RE 122A are shown). Links 126 provide link level redundancy by switching traffic from one to the other when there are link faults. Control boards 124 may be part of or insertable within router chassis 52 (FIG. 2), for example. The control boards 124 provide external interfaces by which links 126 couple CBs 124 to GNF REs 120. Each of BSYS REs 122A-122B ("BSYS REs 122") includes respective interfaces em0 and em1 for connecting to respective ones of CBs 124. BSYS REs 122 are coupled via CBs 124 to FPC 128 associated with the GNF. CBs 124 may be coupled to other FPCs (not shown), some of which may also be associated with the same virtual node, and some of which may be associated with different virtual nodes of the network device.

Figure 5:
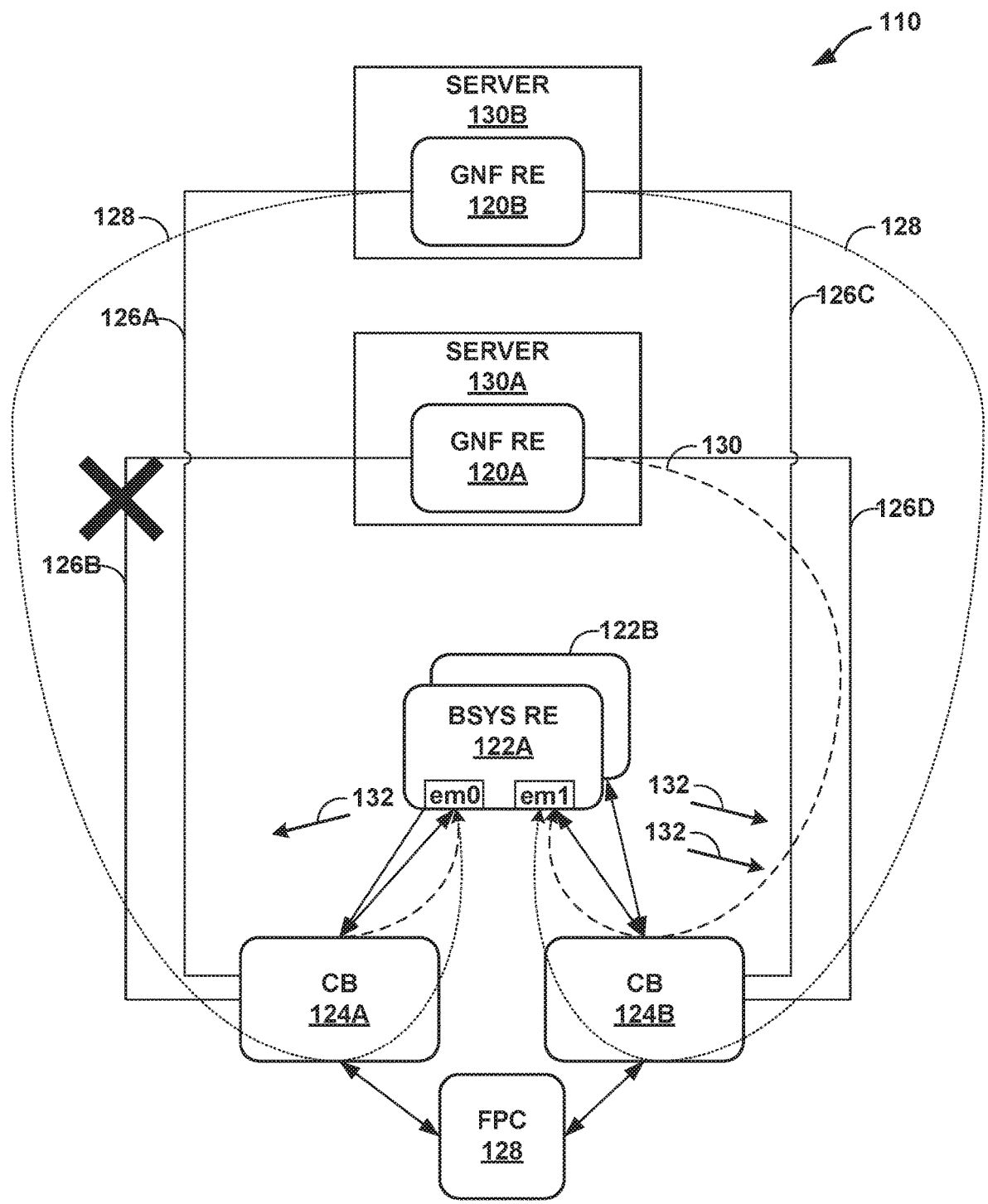
Figure 6:
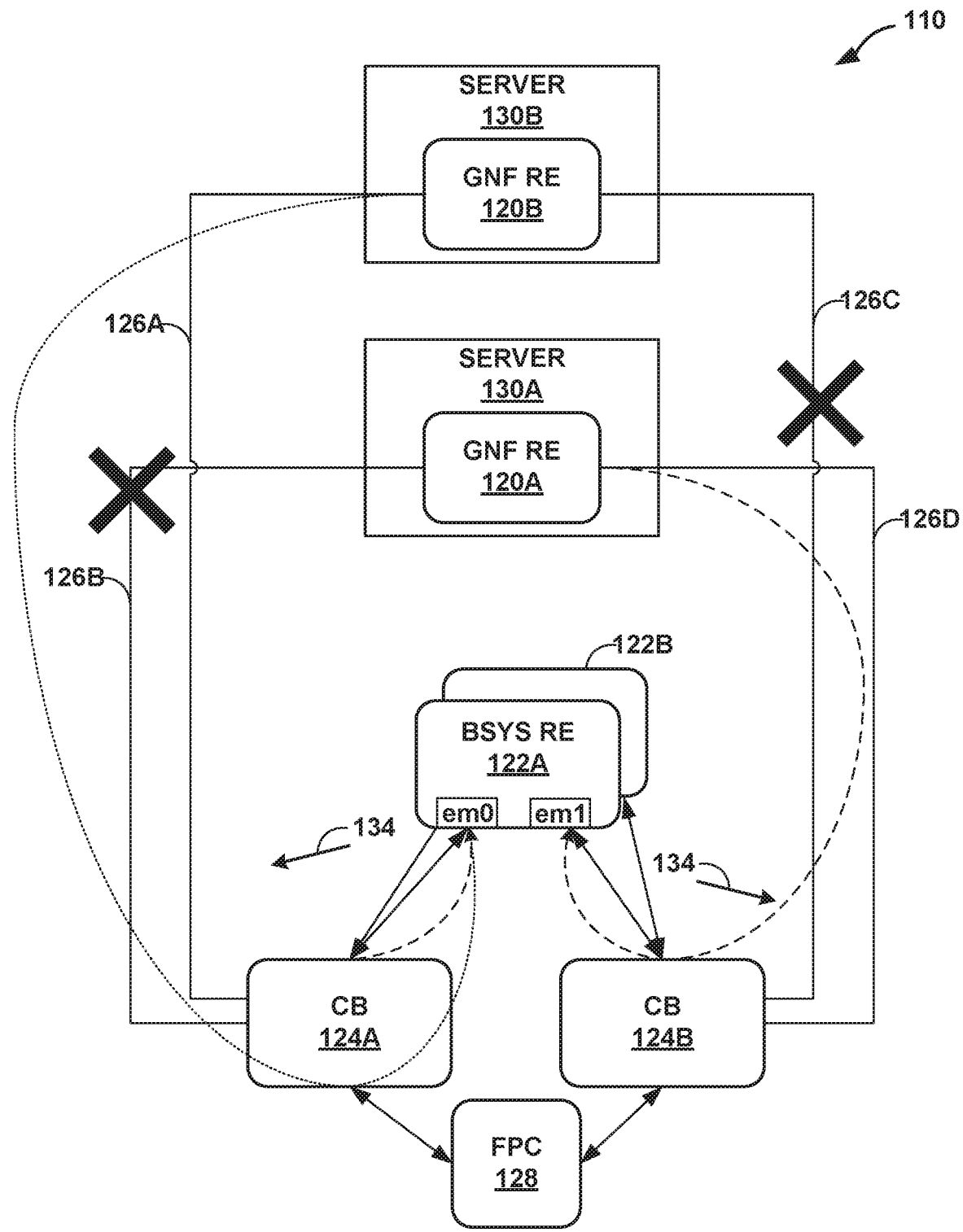

FIGS. 4-6 illustrate example operation of an example GNF mastership arbitration logic as described herein. Assume GNF RE 120A is the master RE and GNF RE 120B is the backup RE. Steady state in which all links and VMs are operational is shown in FIG. 4.

TABLE 1 is an example of a Current ICP table, in the context of the example of FIG. 4 when the network system is in a steady state.

TABLE 1

| Name | ICPaddr | MAC address | IF | MTU |
|---|---|---|---|---|
| GNF RE 120A | 0x3e000101 | 02:00:00:3e:01:04 | em0 | 1496 |
| GNF RE 120B | 0x3e000106 | 02:01:00:3e:01:05 | em1 | 1496 |

TABLE 2 is an example of a Backup ICP table, in the context of the example of FIG. 4 when the network system is in a steady state:

TABLE 2

| Name | ICPaddr | MAC address | IF | MTU |
|---|---|---|---|---|
| GNF RE 120A | 0x3e000101 | 02:00:00:3e:01:04 | em1 | 1496 |
| GNF RE 120B | 0x3e000106 | 02:01:00:3e:01:05 | em0 | 1496 |

GNF reachability information that the BSYS RE derives from TABLE 1 and TABLE 2: 4b'1111 (four bits each set to 1). BSYS RE 122A sends control messages 132 on the physical links 132, wherein the control messages 132 specify the determined GNF reachability information. When Link 126B goes down:

TABLE 3 is an example of a Current ICP table, in the context of the example of FIG. 5 after Link 126B goes down.

TABLE 3

| Name | ICPaddr | MAC address | IF | MTU |
|---|---|---|---|---|
| GNF RE 120A | 0x3e000101 | 02:00:00:3e:01:04 | em1 | 1496 |
| GNF RE 120B | 0x3e000106 | 02:01:00:3e:01:05 | em1 | 1496 |

TABLE 4 is an example of a Backup ICP table, in the context of the example of FIG. 5 after Link 126B goes down:

TABLE 4

| Name | ICPaddr | MAC address | IF | MTU |
|---|---|---|---|---|
| GNF RE 120A | 0x3e000101 | 02:00:00:3e:01:04 | em0 | 1496 |

From this state of the current and backup ICP tables, BSYS RE 122A derives the following GNF reachability information: 4b'1110. BSYS RE 122A sends control messages 133 on the remaining links, wherein the control messages 133 specify the determined GNF reachability information.

When Link 126C goes down (with Link 126B failure continuing to exist): FIG. 6. TABLE 5 is an example of a Current ICP table, in the context of the example of FIG. 6 after Link 126C goes down (with Link 126B failure continuing to exist).

TABLE 5

| Name | ICPaddr | MAC address | IF | MTU |
|---|---|---|---|---|
| GNF RE 120A | 0x3e000101 | 02:00:00:3e:01:04 | em1 | 1496 |
| GNF RE 120B | 0x3e000106 | 02:01:00:3e:01:05 | em0 | 1496 |

In the example of FIG. 6 after Link 126C goes down (with Link 126B failure continuing to exist), backup ICP table is EMPT.

From this state of the current and backup ICP tables, BSYS RE 122A derives the following GNF reachability information: GNF reachability information: 4b'0110

BSYS RE 122A sends control messages 134 on the remaining links, wherein the control messages 134 specify the determined GNF reachability information. At this stage GNF RE 120A and GNF RE 120B are isolated because they are no longer reachable on the same Ethernet segment. However, GNF RE 120B does not take over mastership due to Rule #2 of "If current backup, and at least one master reachability bit set, the GNF RE continues to remain as backup," GNF is functional with GNF RE 120A instance as the master and there is no disruption to user.

Figure 7:
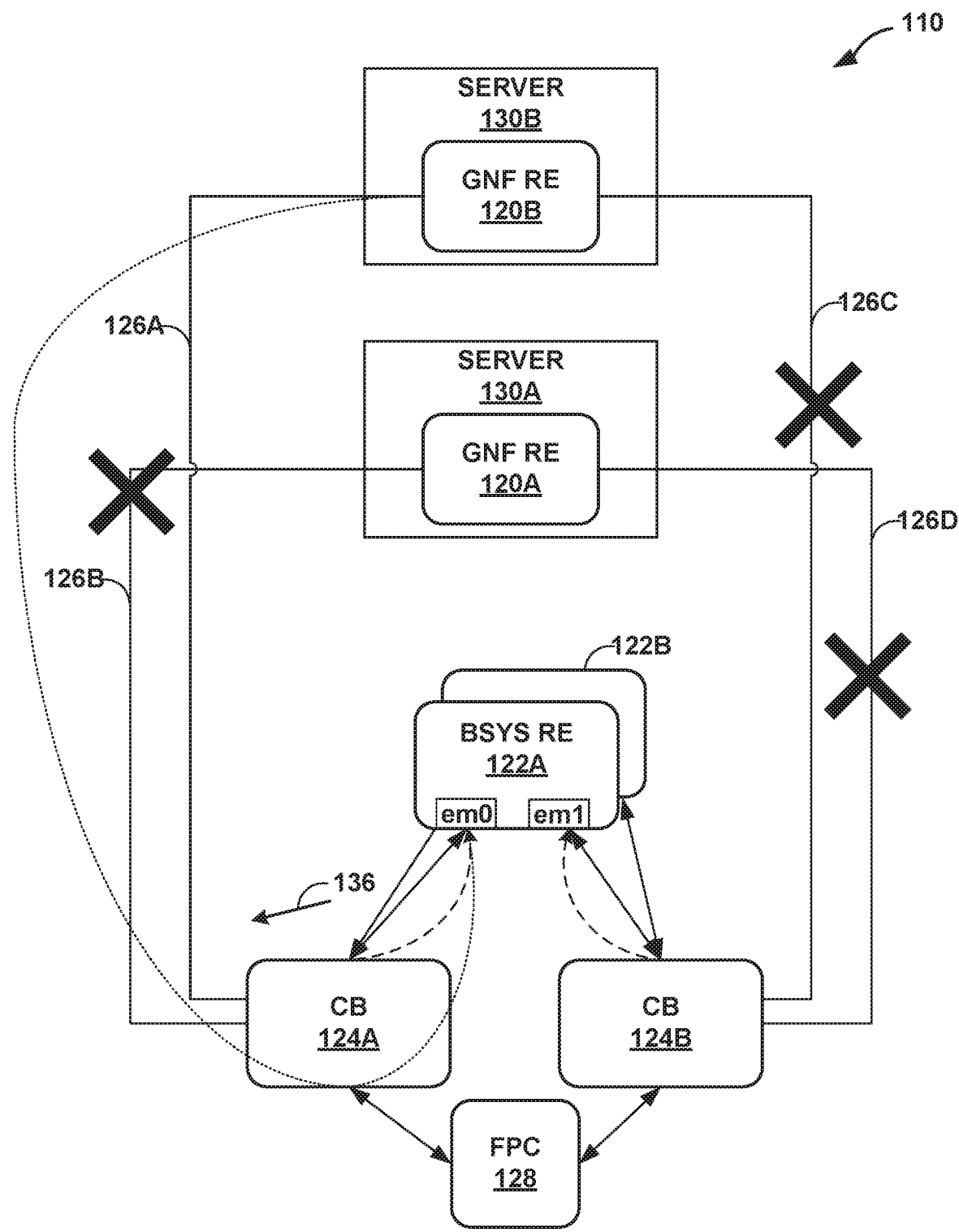

When Link 126D goes down (with Link 126B and Link 126C failures continuing to exist), as in FIG. 7.

Current ICP Table:

TABLE 6

| Name | ICPaddr | MAC address | IF | MTU |
|---|---|---|---|---|
| GNF RE 120B | 0x3e000106 | 02:01:00:3e:01:05 | em0 | 1496 |

Backup ICP table is EMPTY.
Based on this state of the current and backup ICP tables, BSYS RE derives the following GNF reachability information: 4b'0100.

BSYS RE 122A sends control message 136 on the remaining link, wherein the control message 136 specifies the determined GNF reachability information.

At this stage GNF RE 120A is unreachable. GNF RE 120B will take over mastership due to Rule #1 of "If current backup, and both master reachability bits not set, the GNF RE will acquire mastership."

Figure 8:
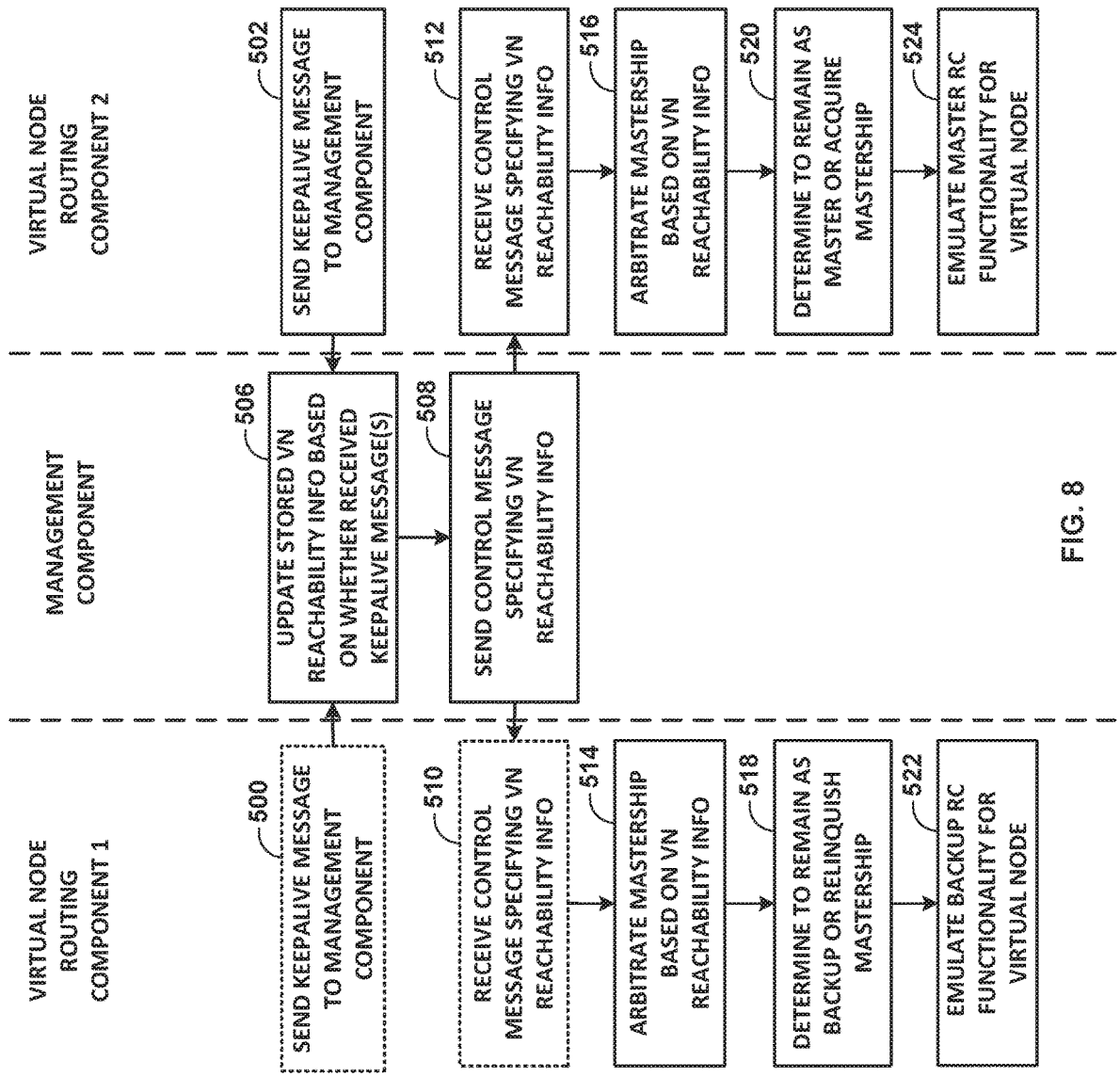
FIG. 8 is a flowchart illustrating an example mode of operation, in accordance with techniques described in this disclosure.

FIG. 8 is a flowchart illustrating an example mode of operation, in accordance with techniques described in this disclosure. FIG. 8 will be described for purposes of example with respect to previous figures, e.g., FIGS. 3-7.

The management component detects reachability of the network device with the first routing component for the virtual node, and detects reachability of the network device with the second routing component for the virtual node. For example, a first routing component executing external to a network device chassis, such as GNF RE 120A, sends a keepalive (e.g., hello) message to a management component of the network device, such as BSYS RE 122A (500). A second routing component external to the network device, such as GNF RE 120B, sends a keepalive message to the management component (502). The management component updates stored virtual node reachability information based on whether keepalive messages were received from one or more of the routing components on one or more links (506). For example, BSYS RE 122A updates current and backup ICP data structures 68 based on the whether the BSYS 122A receives keepalive messages from the first GNF RE VM and the second GNF RE VM. BSYS RE 122A derives GNF reachability information based on the current and backup ICP data structures 68.

The management component generates and sends a control message specifying the reachability information (508). For example, BSYS RE 122A creates a control message specifying the GNF reachability information. The control message may be a message such as message 80 (FIG. 3). BSYS RE 122A sends the control message to the first and second GNF RE VMs. BYS RE 122A send the control message out on every interface. In some examples, management component may derive the virtual node reachability information and send the control message at periodic intervals, for example, every 1 second. The first and/or second routing components receive the control message specifying the virtual node reachability information from the management component (510, 512). For example, the first and/or second GNF RE VMs receive the control message specifying the GNF reachability information from BSYS RE 122A.

Steps 500 and 510 are depicted in dashed lines a being optional, because one of the steps may not occur in some cases. For example, one or more of links 126 coupling servers 130 to CBs 124 and providing reachability to BSYS RE 122A may be down, or one of GNF RE VMs 120 may be down. In those cases, BSYS RE 122A may not receive a keepalive message from either or both of the first or second GNF RE VMs, and may update its GNF reachability information based on not having received the keepalive message to indicate that the GNF is unreachable. If the first GNF RE VM is unreachable, for example, the first GNF RE VM will not receive the control message from BSYS RE 122A.

Assuming both are operational, each of the first and second routing components will arbitrate mastership based on the reachability information received from the management component (514, 516). In some examples, the routing components need not necessarily store the reachability information from the control message, but can arbitrate based on the reachability information present in the message. In some examples, the reachability information may be cached. Each of the first and second routing components may arbitrate mastership according to a configured algorithm. In some examples, the arbitration is handled by a mastership control thread having high priority, which may not be affected by scheduling and is independent of a packet control thread. For example, the mastership control thread may 'wake up' every configurable time period, e.g., every 1 second, to run the algorithm based on the cached reachability information. For example, the first and second routing components may independently use the following rules to determine mastership:

1. If current backup, and both master reachability bits not set, the GNF RE will acquire mastership.
2. If current backup, and at least one master reachability bit set, the GNF RE continues to remain as backup.
3. If current backup, and no master reachability ICP control packets received within a configurable time period (e.g., 3 seconds), the GNF RE continues to remain as backup.

4. If current master, and at least one master reachability bit set, the GNF RE continues to remain as master.

5. If current master, and both master reachability bit not set, the GNF RE will relinquish mastership.

6. If current master, and no master reachability ICP control packets received within a configurable time period (e.g., 3 seconds), the GNF RE will relinquish mastership.

The initial current master state of the routing component may in some examples be configured in the kernel when the routing component virtual machine is launched. The routing components may be configured to understand, based on state in their kernels, the routing components which bits of the received control message are master reachability bits. In the example of FIG. 7, based on the based on the routing component reachability information received from the management component, the first routing component determines to remain as the backup or, if the first routing component was the master, will relinquish mastership (518). In serving as the backup routing component, the first routing component will then emulate backup routing component functionality for the virtual node (522). In the example of FIG. 7, based on the based on the GNF reachability information received from BSYS RE 122A, the second routing component determines to remain as the master or, if the second routing component was the backup, will acquire mastership (520). In serving as the master routing component, the second routing component will then emulate master routing component functionality for the virtual node (524).

In this manner, the techniques of this disclosure may prevent a backup-backup condition from occurring even in the presence of a split-brain condition. This allows a virtual node to be in-service even in the presence of multiple faults in connectivity between an external control plane and the router chassis base system.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of this disclosure have been described. These and other aspects are within the scope of the following claims.

What is claimed is:

1. A system comprising:
   a management component executing on a network device;
   a first routing component executing on a first server device physically separate from the network device and configured to provide control plane routing functionality for a virtual node of a plurality of virtual nodes configured on the network device; and
   a second routing component executing on a second server device physically separate from the network device and configured to provide control plane routing functionality for the virtual node, wherein the first routing component and the second routing component operate as a master-backup pair for the virtual node such that, at a given time, one of the first routing component and the second routing component is a master routing component of the master-backup pair and the other of the first routing component and the second routing component is a backup routing component of the master-backup pair,
   wherein the management component is configured to detect first reachability of the network device with the first routing component and second reachability of the network device with the second routing component, and send a control message to each of the first routing component and the second routing component, the control message specifying reachability information indicating the first reachability and the second reachability, and
   wherein one or more of the first routing component and the second routing component are configured to determine, in response to receiving the control message and based on the reachability information, whether to operate as the master routing component for the virtual node.

2. The system of claim 1, further comprising:
   a first physical link providing connectivity between the first routing component and the management component; and
   second physical link providing connectivity between the second routing component and the management component.

3. The system of claim 2, wherein to detect reachability with the first routing component, the management component is configured to determine whether a keepalive message is received on the first physical link.

4. The system of claim 1,
   wherein the first reachability comprises reachability of a first interface of the network device with the first routing component, wherein the second reachability comprises reachability of the first interface of the network device with the second routing component,
wherein the management component is configured to detect third reachability of a second interface of the network device with the first routing component, and fourth reachability of the second interface of the network device with the second routing component, and
wherein in sending the control message the management component sends a control message specifying reachability information indicating the first reachability, second reachability, third reachability, and fourth reachability.

5. The system of claim 1, wherein the control message specifies the reachability information by a set of bits each indicating one of the first reachability, the second reachability, the third reachability, and the fourth reachability, wherein two bits of the set of bits are master reachability bits indicating reachability of a master routing component.

6. The system of claim 5, wherein the first routing component is configured to determine whether to operate as the master routing component by:
when the first routing component is currently a backup, and both master reachability bits are not set, acquiring mastership to operate as the master routing component;
when the first routing component is currently the backup routing component, and at least one master reachability bit is set, continuing to remain as the backup routing component;
when the first routing component is currently the backup routing component, and no subsequent control message is received within a configurable time period, continuing to remain as the backup routing component;
when the first routing component is currently the master routing component, and at least one master reachability bit is set, continuing to remain as the master routing component;
when the first routing component is currently the master routing component, and both master reachability bits are not set, relinquishing mastership to operate as the backup routing component; and
when the first routing component is currently the master routing component, and no subsequent control message is received within a configurable time period, relinquishing mastership to operate as the backup routing component.

7. The system of claim 1, wherein the first routing component and the second routing component are configured to manage, in a line card of the network device, forwarding state for forwarding packets for the virtual node.

8. The system of claim 1, wherein the virtual node comprises a first virtual node, and wherein the single-chassis network device further comprises:
a plurality of packet processors, the first virtual node configured to forward packets using a first subset of the plurality of packet processors; and
a second virtual node of the plurality of virtual nodes, the second virtual node configured to forward packets using a second subset of the plurality of packet processors, the second subset being distinct from the first subset.

9. The system of claim 8, further comprising:
a third routing component executing on the first server device, the third routing component configured to provide control plane routing functionality for the second virtual node; and
a fourth routing component executing on the second server device, the fourth routing component configured to provide control plane routing functionality for the second virtual node, wherein the third routing component and the fourth routing component operate as a master-backup pair for the second virtual node.

10. The system of claim 1, wherein the first routing component and the second routing component each comprises a virtual machine.

11. A method comprising:
detecting, by a management component executing on a network device, first reachability of the network device with a first routing component and second reachability of the network device with a second routing component, wherein the first routing component executes on a first server device physically separate from the network device and is configured to provide control plane routing functionality for a virtual node of a plurality of virtual nodes configured on the network device, and wherein the second routing component executes on a second server device physically separate from the network device and is configured to provide control plane routing functionality for the virtual node, wherein the first routing component and the second routing component operate as a master-backup pair for the virtual node such that one of the first routing component and the second routing component is a master routing component of the master-backup pair and the other of the first routing component and the second routing component is a backup routing component of the master-backup pair; and
sending, by the management component, a control message to each of the first routing component and the second routing component, the control message specifying reachability information indicating the first reachability and the second reachability, wherein the reachability information determines a mastership arbitration by which one or more of the first routing component and the second routing component determine whether to operate as the master routing component for the virtual node.

12. The method of claim 11, wherein the first reachability comprises reachability of a first interface of the network device with the first routing component, wherein the second reachability comprises reachability of the first interface of the network device with the second routing component,
the method further comprising:
detecting, by the management component, third reachability of a second interface of the network device with the first routing component; and
detecting, by the management component, fourth reachability of the second interface of the network device with the second routing component, and
wherein sending the control message comprises sending a control message specifying reachability information indicating the first reachability, second reachability, third reachability, and fourth reachability.

13. The method of claim 11, further comprising:
determining, by one or more of the first routing component and the second routing component in response to receiving the control message and based on the reachability information, whether to operate as the master routing component for the virtual node.

14. The method of claim 11,
wherein the control message causes the first routing component and second routing component to swap master and backup roles for providing control plane routing functionality for the virtual node.

15. A method comprising:
receiving, by a first routing component executing on a first server device physically separate from a network device and configured to provide control plane routing functionality for a virtual node of a plurality of virtual nodes configured on the network device, a control message specifying reachability information, the control message received from a management component executing on the network device, and the reachability information comprising first reachability of the network device with the first routing component as detected by the management component and second reachability of the network device with a second routing component as detected by the management component, wherein the second routing component executes on a second server device physically separate from the network device and is configured to provide control plane routing functionality for the virtual node, wherein the first routing component and the second routing component operate as a master-backup pair for the virtual node such that one of the first routing component and the second routing component is a master routing component of the master-backup pair and the other of the first routing component and the second routing component is a backup routing component of the master-backup pair; and
determining, by the first routing component in response to receiving the control message and based on the reachability information, whether to operate as the master routing component for the virtual node.

16. The method of claim 15, wherein determining whether to operate as the master routing component for the virtual node comprises one of the group consisting of: determining to acquire mastership to operate as the master routing component, and continuing to remain as the master routing component.

17. The method of claim 16, wherein determining whether to operate as the master routing component for the virtual node comprises one of the group consisting of: determining to relinquish mastership, and continuing to remain as the backup routing component.

18. The method of claim 15, wherein the first reachability comprises reachability of a first interface of the network device with the first routing component, wherein the second reachability comprises reachability of the first interface of the network device with the second routing component, the reachability information further comprising third reachability of a second interface of the network device with the first routing component, and fourth reachability of the second interface of the network device with the second routing component, and
wherein receiving the control message comprises receiving a control message specifying the reachability information by a set of bits each indicating one of the first reachability, the second reachability, the third reachability, and the fourth reachability, wherein two bits of the set of bits are master reachability bits indicating reachability of a master routing component.

19. The method of claim 18, wherein determining, by the first routing component, whether to operate as the master routing component for the virtual node comprises:
when the first routing component is currently a backup, and both master reachability bits are not set, acquiring mastership to operate as the master routing component;
when the first routing component is currently the backup routing component, and at least one master reachability bit is set, continuing to remain as the backup routing component;
when the first routing component is currently the backup routing component, and no subsequent control message is received within a configurable time period, continuing to remain as the backup routing component;
when the first routing component is currently the master routing component, and at least one master reachability bit is set, continuing to remain as the master routing component;
when the first routing component is currently the master routing component, and both master reachability bits are not set, relinquishing mastership to operate as the backup routing component; and
when the first routing component is currently the master routing component, and no subsequent control message is received within a configurable time period, relinquishing mastership to operate as the backup routing component.

20. A non-transitory computer-readable storage medium comprising instructions for causing one or more programmable processors of a first server device to:
receive, by a first routing component executing on the first server device and configured to provide control plane routing functionality for a virtual node of a plurality of virtual nodes configured on a network device, a control message specifying reachability information, the control message received from a management component executing on the network device, and the reachability information including first reachability of the network device with the first routing component as detected by the management component and second reachability of the network device with a second routing component as detected by the management component, wherein the first server device is physically separate from the network device, and wherein the second routing component executes on a second server device physically separate from the network device and is configured to provide control plane routing functionality for the virtual node, wherein the first routing component and the second routing component operate as a master-backup pair for the virtual node such that one of the first routing component and the second routing component is a master routing component of the master-backup pair and the other of the first routing component and the second routing component is a backup routing component of the master-backup pair; and
determine, in response to receipt of the control message and based on the reachability information, whether the first routing component is to operate as the master routing component for the virtual node.

* * * * *